United States Patent [19]
Fujisawa

[11] Patent Number: 5,530,691
[45] Date of Patent: Jun. 25, 1996

[54] DISC CARTRIDGE

[75] Inventor: Hirotoshi Fujisawa, Tokyo, Japan

[73] Assignee: Sony Corporation, Tokyo, Japan

[21] Appl. No.: 146,431

[22] Filed: Oct. 29, 1993

Related U.S. Application Data

[63] Continuation of Ser. No. 821,991, Jan. 16, 1992, abandoned.

[30] Foreign Application Priority Data

Jan. 21, 1991 [JP] Japan ..................................... 3-019139
May 31, 1991 [JP] Japan ..................................... 3-155453

[51] Int. Cl.⁶ .................................................. G11B 23/03
[52] U.S. Cl. .......................................... 369/291; 360/133
[58] Field of Search .................................. 369/291, 77.2; 360/133; 206/444

[56] References Cited

U.S. PATENT DOCUMENTS

| | | | |
|---|---|---|---|
| 4,613,044 | 9/1986 | Saito et al. .............................. | 206/444 |
| 4,731,776 | 3/1988 | Ishii et al. ............................... | 369/77.2 |
| 5,046,170 | 9/1991 | Oshima et al. .......................... | 360/133 |

FOREIGN PATENT DOCUMENTS

| | | |
|---|---|---|
| 0126884A1 | 12/1984 | European Pat. Off. . |
| 0174111A3 | 3/1986 | European Pat. Off. . |
| 0195535 | 9/1986 | European Pat. Off. . |
| 0205074A3 | 12/1986 | European Pat. Off. . |
| 0368416A1 | 5/1990 | European Pat. Off. . |
| 0424985 | 5/1991 | European Pat. Off. ............... 369/291 |
| 0463575A2 | 1/1992 | European Pat. Off. . |
| 3606600 | 9/1986 | Germany . |
| 2208330 | 3/1989 | United Kingdom . |

Primary Examiner—Stuart S. Levy
Assistant Examiner—Paul J. Ditmyer
Attorney, Agent, or Firm—Limbach & Limbach

[57] ABSTRACT

A disc cartridge including a cartridge body formed with an aperture for exposing at least a part of the signal recording area of an accommodated disc, and a shutter member slidably mounted on the cartridge body for opening or closing the aperture, is disclosed. The cartridge body is provided with a shutter opening groove extending along the sliding direction of the shutter member which is parallel to the direction of insertion of the disc cartridge into a recording and/or reproducing apparatus adapted for recording and/or reproducing information signals on or from the disc, and a mistaken insertion inhibiting groove extending parallel to the shutter opening groove and having a length shorter than that of the shutter opening groove. Mistaken insertion of the disc cartridge may be inhibited by mistaken insertion inhibiting pins provided in the recording and/or reproducing apparatus for mating with each of these grooves.

1 Claim, 8 Drawing Sheets

DISC CARTRIDGE

This is a continuation of application Ser. No. 07/821,991 filed on Jan. 16, 1992, now abandoned.

BACKGROUND OF THE INVENTION

1. Field of the Invention

This invention relates to a disc cartridge having accommodated therein a disc on which predetermined information signals are recordable, or have been recorded, such as a magneto-optical disc or an optical disc.

2. Description of Related Art

There has previously been proposed a disc for recording and/or reproducing information signals, such as a magneto-optical disc or an optical disc. This disc is comprised of a disc-shaped base plate and a recording layer formed on at least one major surface of the base plate. The central portion of the disc is formed as a clamping portion which is retained by a disc driving unit of a recording and/or reproducing apparatus adapted for recording and/or reproducing information signals on or from the disc. The portion of the disc lying around the clamping portion is reserved as a signal recording area on or from which the information signals are written or read.

Referring to FIGS. 1 and 2, there has hitherto been proposed a disc cartridge comprised of a cartridge body 102 and a shutter member 104 which is accommodated within the cartridge body for preventing deposition of dust and dirt on a disc 101 or injuries thereto due to contact especially with hands or fingers as well as for facilitating handling of the disc 101. The disc 101 accommodated within the cartridge body 102 may be rotated therein by disc rotating means. Referring to FIG. 2, the major surface of the cartridge body 102 is formed with an aperture 103 by means of which at least a part of the signal recording surface of the disc may be exposed to outside ac ross its inner and outer peripheries. The information signals may be recorded and/or reproduced on or from the signal recording area by means of the disc recording and/or reproducing apparatus through the aperture 103.

The disc cartridge is provided with a shutter member 104 for closing the aperture 103 during non-use the disc cartridge as shown in FIG. 1 for protecting the disc 101 by preventing intrusion of dust and dirt into the inside of the cartridge body 102. The shutter member 104 is provided with a shutter portion 105 of a size large enough to close the aperture 103. The shutter portion 105 is formed with a through-hole 106 corresponding in size and shape to the aperture 103. The shutter member 104 is mounted for sliding along a lateral side of the cartridge body 102 by having its proximal end face 108 supported by a corresponding lateral side of the cartridge body 102. The shutter member 104 is supported for sliding between a first position of closing the aperture 103 by the shutter portion 105 as shown in FIG. 1 and a second position of opening the aperture 103 with the through-hole 106 in register with the aperture 103 as shown in FIG. 2.

Meanwhile, the shutter member 104 is constituted by bending a substantially rectangular metallic plate. The shutter member 104 may also be formed by bending a plate of synthetic resin or by integral molding of synthetic resin.

A recess 107 for guiding the shutter portion 105 is formed on the major surface of the cartridge body 102 in an area thereof corresponding to the travel passage of the shutter portion 105. The recess 107 is of a depth corresponding to the thickness of the shutter portion 105. Thus the upper surface of the shutter portion 105 is substantially flush with the major surface of the cartridge body 102 for the entire sliding stroke of the shutter member with respect to the cartridge body 102.

When loaded on the disc recording and/or reproducing apparatus, the disc cartridge is introduced at an entrance opening provided in the disc recording and/or reproducing apparatus with a direction normal to the sliding direction of the shutter member 104 as the inserting direction by an arrow d in FIG. 1.

At this time, the shutter member 104 is slid by a shutter member opening device, not shown, provided in the recording and/or reproducing apparatus, in a direction of opening the aperture 103, as shown by an arrow c in FIG. 2.

With the above described disc cartridge, if the disc cartridge is inserted at the entrance opening in a mistaken direction, there arises a risk that those portions of the cartridge body 102 not provided with the aperture 103 be abutted by a magnetic device or an optical head device provided in the disc recording and/or reproducing apparatus, possibly causing injuries or destruction of the magnetic device, optical head device or the cartridge body 102.

With a conventional disc cartridge, the length of a side of the cartridge body 102 parallel to its inserting direction shown by arrow a in FIG. 1, that is the side corresponding to a lateral side of the cartridge body 102, is selected to be longer than that of a side thereof normal to the inserting direction shown by arrow b in FIG. 1, that is a side corresponding to the forward side of the cartridge body 102. In such case, the mistaken operation of introducing the cartridge body 102 into the entrance opening in a direction normal to the proper inserting direction may be prevented by selecting the length of the entrance opening to be approximately equal to the length of the side of the cartridge body 102 normal to the proper inserting direction.

However, with such disc cartridge, since it is necessary to select the lengths of the lateral sides of the cartridge body 102 as described above, it becomes necessary to increase the size of the cartridge body beyond the minimum size required for accommodating the disc 101.

On the other hand, even if the length of the lateral side of the cartridge body 102 is selected to differ from that of its forward side, it is impossible to prevent mistaken inserting operations of inserting the disc cartridge at the entrance opening with the rear side of the cartridge body as the leading end or of inserting the disc cartridge body in a topsy-turvied position.

It may be envisaged to provide first and second mistaken insertion inhibiting grooves 111, 113 on the lateral sides of the cartridge body 102, as shown in FIGS. 3 and 4, thereby preventing the disc cartridge from being introduced in the direction normal to the proper inserting direction without the necessity of enlarging the length of the lateral side of the cartridge body 102 shown by arrow a in FIG. 4. The first mistaken insertion inhibiting groove 111 is formed on the bottom surface of the cartridge body 102 for extending from the forward side towards the rear side of the cartridge body 102 when looking in its inserting direction shown by arrow d in FIG. 4. The second mistaken insertion inhibiting groove 113 is formed on the lateral side of the cartridge body 102 for extending from the leading side towards the trailing side of the cartridge body 102 when looking in its inserting direction shown by arrow d in FIG. 4. The distance between the grooves 111 and 113, indicated by double-headed arrow b in FIG. 4, is selected to be shorter than the length of the lateral side of the cartridge body 102 shown by double-headed arrow A in FIG. 4. In this manner, if lugs or the like mating with these grooves 111, 113 are provided in the vicinity of the entrance opening provided in the disc recording and/or reproducing apparatus, the cartridge body 102 may be positively prevented from being introduced into the entrance opening in the direction normal to its proper inserting direction.

However, there are occasions wherein indicating holes or grooves are formed on the outer lateral side of the cartridge body 102 for indicating disc types, such as a disc in which information signals may be recorded and reproduced, e.g. a magneto-optical disc, a disc in which information signals may be recorded and reproduced but in which information signals, once recorded, can not be erased, or a disc in which information signals can only be reproduced, e.g. an optical disc. With the above described disc recording and/or reproducing apparatus, it is necessary to adjust or switch the intensities of the magnetic field produced by the magnetic head as an external magnetic field generating device, operating or non-operating states or the light output of the optical pickup device, depending on the disc types. For this reason, microswitches or the like are provided in the disc recording and/or reproducing apparatus for detecting the presence or absence of these indicating holes or grooves for performing the adjusting or switching operations.

If the mistaken insertion preventing grooves are provided in the cartridge body already provided with these indicating holes or grooves, there arises a risk that the cartridge body becomes inferior in mechanical strength such that the disc 101 can not be protected positively. On the other hand, if the mistaken insertion inhibiting grooves are provided in the cartridge body, the area on the lateral side thereof to be reserved for the indicating holes or grooves becomes narrow so that the disc cartridge needs to be enlarged in size for providing these indicating holes or grooves.

OBJECTS AND SUMMARY OF THE INVENTION

It is an object of the present invention to provide a disc cartridge which can be prevented from being introduced into the recording and/or reproducing apparatus in a mistaken or incorrect manner without enlarging the size of the disc cartridge or without lowering its mechanical strength.

It is another object of the present invention to provide a disc cartridge in which the mistaken insertion inhibiting grooves may be used for discriminating the disc types.

In accordance with the present invention, there is provided a disc cartridge comprising a cartridge body having an aperture for exposing at least a part of a signal recording area of a disc accommodated therein, a shutter slidably mounted on said cartridge body for opening and closing said aperture, a shutter opening groove formed in the cartridge body for extending along the sliding direction of the shutter which is parallel to the direction of insertion of the disc cartridge into a recording and/or reproducing apparatus adapted for recording and/or reproducing information signals on or from the disc, and a mistaken insertion inhibiting groove formed in the cartridge body for extending parallel to the shutter opening groove, the mistaken insertion inhibiting groove being shorter in length than the shutter opening groove.

The mistaken insertion inhibiting groove is also divided into a plurality of regions of different depths.

Since the disc cartridge is formed with a mistaken insertion inhibiting groove extending parallel to and shorter in length than the shutter opening groove, so that, by providing detection pins or the like means in the recording and/or reproducing apparatus in association with the grooves, it becomes possible to prevent the mistaken inserting operation of inserting the disc cartridge from a mistaken inserting direction.

Since the mistaken insertion inhibiting groove is shorter in length than the shutter opening groove, there is no necesity of enlarging the size of the disc cartridge for the sake of providing the mistaken insertion inhibiting groove.

If the mistaken insertion inhibiting groove is divided into a plurality of regions of different depths, it becomes possible to discriminate the type of the disc accommodated in the disc cartridge.

DETAILED DESCRIPTION OF THE INVENTION

Figure 1:
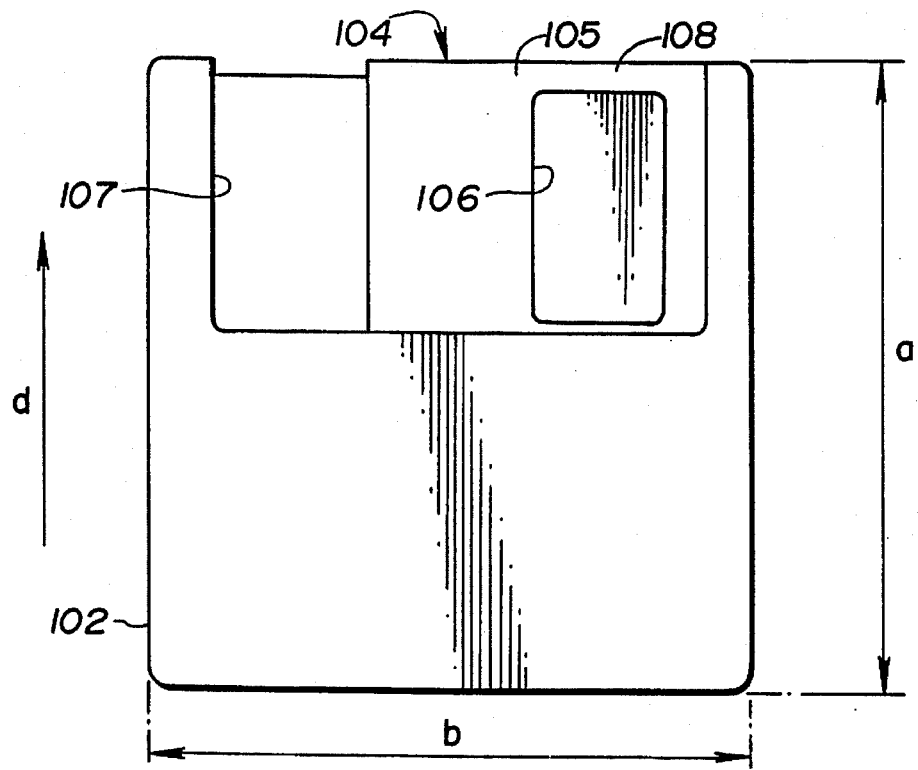
FIG. 1 is a plan view showing a conventional disc cartridge.
Figure 2:
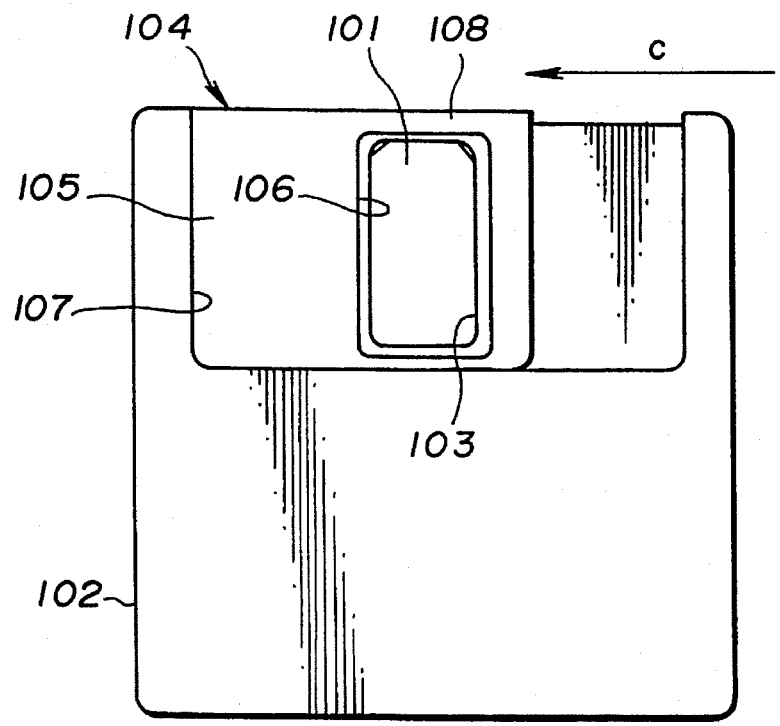
FIG. 2 is a plan view showing the disc cartridge shown in FIG. 1, with a shutter member closing an aperture in the cartridge body.
Figure 3:
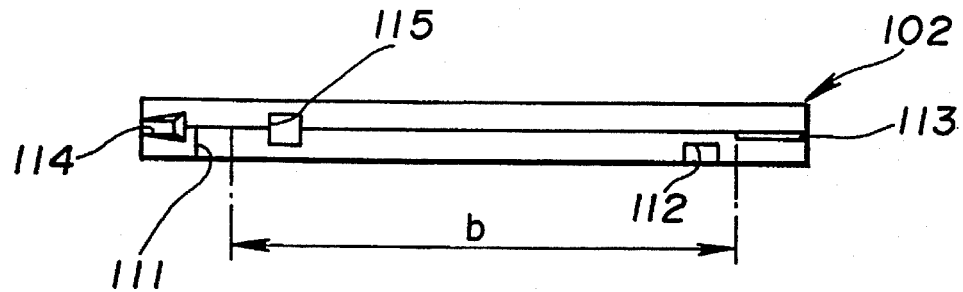
FIG. 3 is a side view, as viewed from the front side, showing a conventional disc cartridge provided with disc type indicating grooves.
Figure 4:
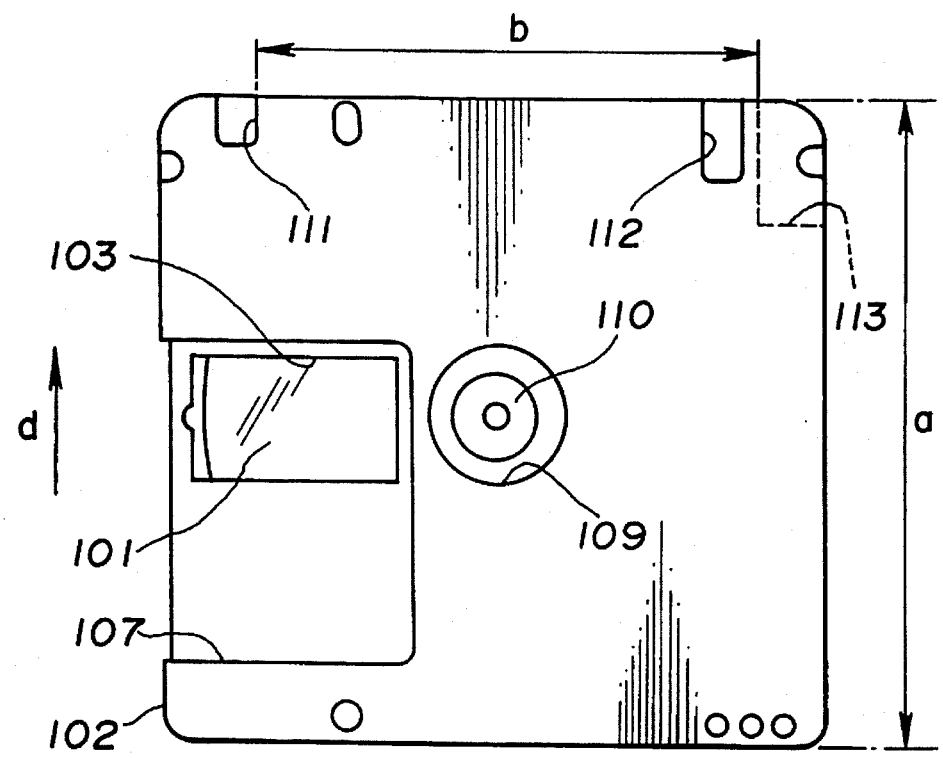
FIG. 4 is a plan view showing the conventional disc cartridge shown in FIG. 3.

Referring to the drawings, preferred embodiments of the present invention will be explained in detail.

In these embodiments, the present invention is applied to a disc cartridge in which a disc accommodated therein is an optical disc for recording and/or reproducing information signals to use a laser beam radiated from a recording and/or reproducing apparatus.

Figure 5:
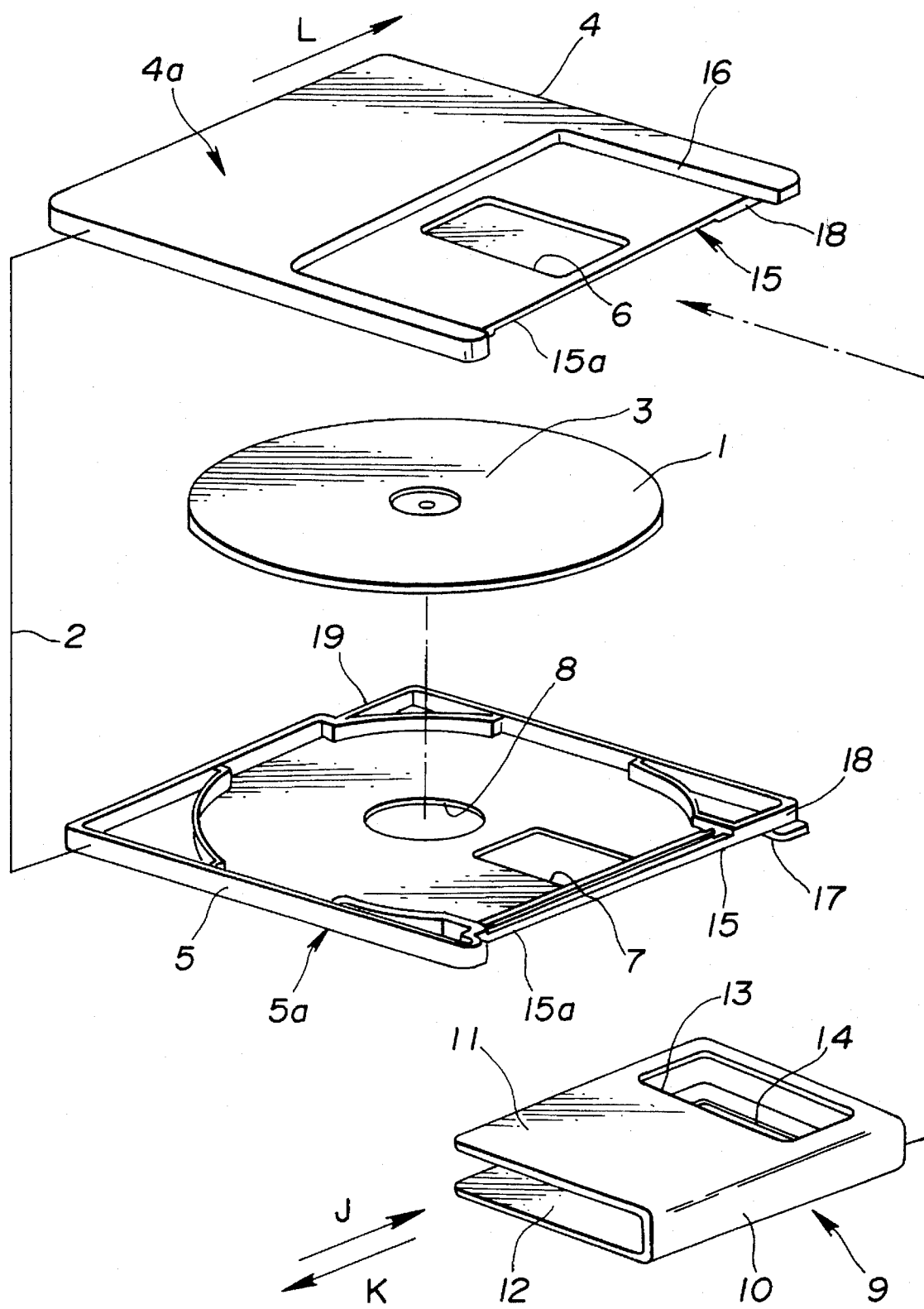
FIG. 5 is an exploded perspective view showing a disc cartridge according to the present invention.

Referring first to FIG. 5, the disc cartridge includes a disc 1 and a cartridge body 2 for accommodating the disc 1. The disc 1, accommodated in the cartridge body 2, is a so-called optical disc in which a recording layer is formed by depositing and molding an optical recording material or a light reflective material on a base plate formed of a light-transmitting synthetic resin or glass. The disc 1 is formed with a central disc hub 3 by means of which the disc may be clamped with respect to a disc rotating device, not shown, provided within the disc recording and/or reproducing apparatus adapted for recording and/or reproducing information signals on or from the recording layer.

The disc hub 3 is disc-shaped and formed of a magnetic material, such as metal. The portion of the disc 1 lying around the disc hub 3 represents a signal recording area for recording and/or reproducing information signals with the aid of the disc recording and/or reproducing apparatus.

On the other hand, the cartridge body 2 is made up of an upper half 4 and a mating lower half 5 of synthetic resin which are abutted and connected to each other such as by ultrasonic welding, adhesive or with set screws, in the form of a thin-walled substantially square-shaped casing. That is, each of upper and lower major surfaces 4a and 5a of the cartridge body 2 extending parallel to the major surface of the disc 1 is in the form of a square each side of which is slightly shorter than the disc diameter. The distance between the major surfaces 4a and 5a, that is the thickness of the cartridge body 2, is slightly thicker than the thickness of the disc hub 3.

The major surfaces 4a and 5a of the cartridge body 2 are formed with an upper recording/reproducing aperture 6 and a lower recording/reproducing aperture 7, respectively, which are in register with each other. These recording/reproducing apertures 6 and 7 are rectangular in profile and extended from near the center of the major surfaces 4a and 5a to close to one sides of the surfaces 4a and 5a, respectively, that is, to close to a lateral side of the cartridge body, so as to be in register with each other with the disc 1 in-between. The upper aperture 6 is adapted for exposing a portion of the signal recording surface of the disc 1 directed towards the upper half 4 to outside across the inner and outer peripheries of the disc. On the other hand, the lower aperture 7 is adapted for exposing a portion of the signal recording surface of the disc 1 directed towards the lower half 5 to outside across the inner and outer peripheries of the disc. The recording and/or reproducing device of the disc recording and/or reproducing apparatus, such as an optical head device, is introduced via these apertures 6 and 7 into the cartridge body 2 for recording and/or reproducing information signals on or from the disc 1.

Meanwhile, if the disc 1 accommodated within the cartridge body 2 is a magneto-optical disc, an external magnetic field generating device for supplying the external magnetic field to the disc needs to be provided in the disc recording and/or reproducing apparatus in addition to the optical head device.

The major surface of the lower half 5 is formed with a circular chucking aperture 8 for permitting the lower surface of the disc hub 3 to be exposed to outside. It is by means of this chucking aperture 8 that a chucking device of disc rotating means of the disc recording and/or reproducing apparatus, such as a disc table, is introduced into the cartridge body 2 for chucking the disc 1.

Figure 6:
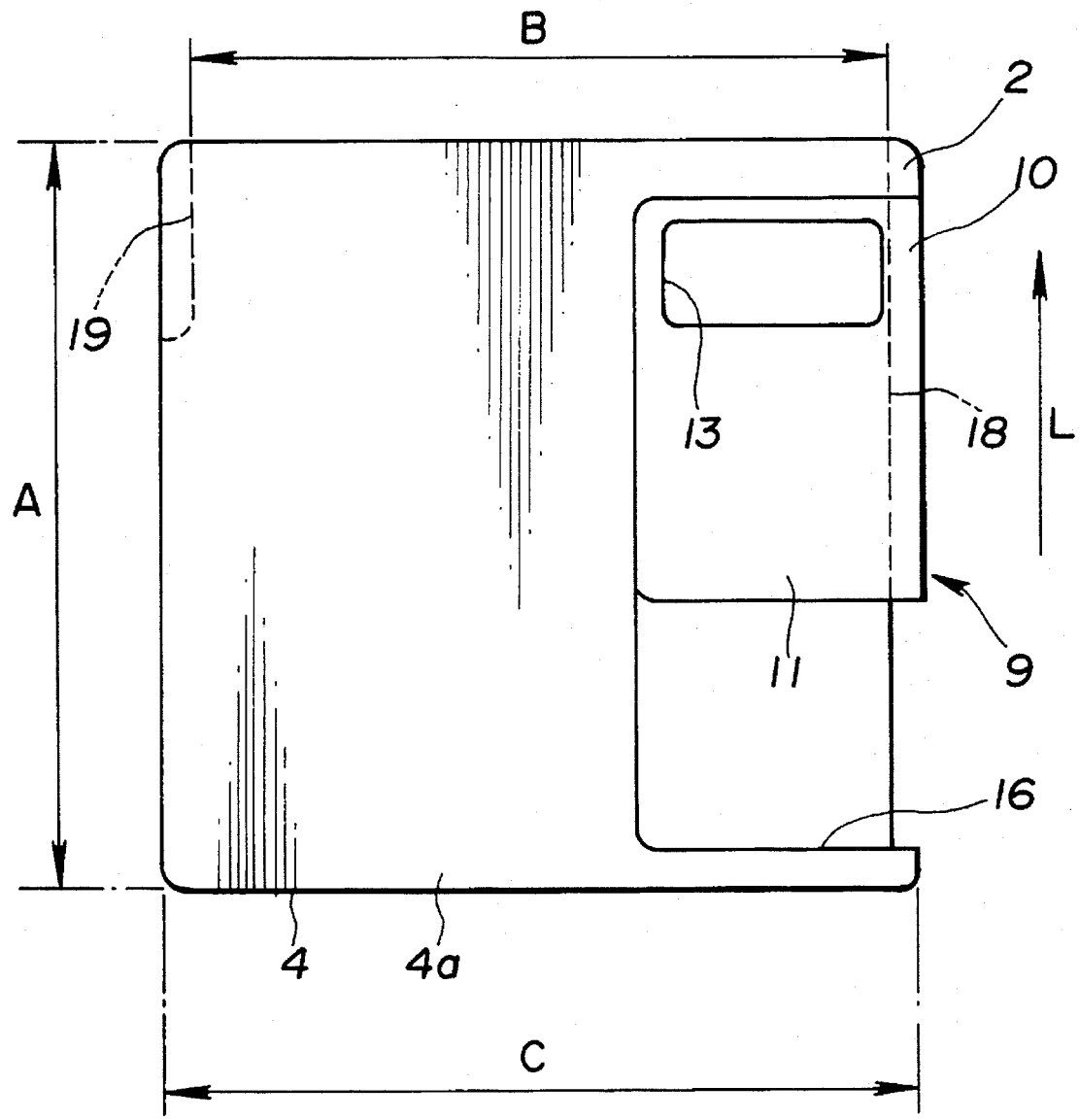
FIG. 6 is a plan view showing a disc cartridge according to an embodiment of the present invention.

A shutter member 9 for opening or closing the recording/reproducing apertures 6 and 7 is mounted on the cartridge body 2, as shown in FIGS. 5 and 6. The shutter member 9 is comprised of a slide portion 10, supported by a lateral side of the cartridge body 2, and upper and lower shutter portions 11 and 12, and is formed integrally from a synthetic resin, such as polyacetal resin. The slide portion 10 is in the form of an elongated plate having a width equal to the thickness of the cartridge body 2. The shutter portions 11 and 12 are in the form of rectangles larger in size than the recording/reproducing apertures 6 and 7 for closing the apertures 6 and 7 and are of a predetermined thickness of an order of, for example, 0.3 min. When seen in cross-section, the shutter member 9 is in the form of a letter U having the slide portion 10 as a web and the shutter portions 11 and 12 as both sides of the letter U, so that the shutter portions face each other with a gap in-between which corresponds to the thickness of the cartridge body 2.

The shutter portions 11 and 12 are formed with throughholes 13 and 14, respectively, which are substantially in register with the recording/reproducing apertures 6 and 7, respectively.

The inner lateral side of the shutter portion 10 directed to the distal free ends of the shutter portions 11 and 12 is formed with engaging lugs, not shown, for engaging with supporting grooves 15, 15 provided in the vicinity of a lateral side of the cartridge body 2. These supporting grooves 15, 15 are defined between a pair of ribs provided in the vicinity of the aforementioned lateral side on the inner lateral sides of the upper and lower halves 4 and 5 for extending parallel to each other and to the aforementioned lateral side. This lateral side of the cartridge body 2 is formed with a slit 15a for extending along the supporting grooves 15, 15.

The engaging lug of the slide portion 10 is introduced via the slit 15a into the cartridge body 2 so that the slide portion 10 is supported with the inner lateral side thereof abutted on the aforementioned lateral side of the cartridge body 2. Since the engaging lug may be slid along the supporting grooves 15, 15, the slide portion 10 may be slid along the aforementioned lateral side of the cartridge body 2.

By having its slide portion 10 supported by the lateral side of the cartridge body 2, the shutter member 9 is supported by the cartridge body 2, with the shutter portions 11 and 12 lying along the upper and lower major surfaces 4a and 5a, respectively. Also, by having its slide portion 10 slidable with respect to the cartridge body 2, the shutter member 9 may be slid with respect to the cartridge body 2, as shown by arrows J and K in FIG. 5, so that the shutter portions 11 and 12 are moved along the upper and lower major surfaces 4a and 5a, respectively.

Figure 7:
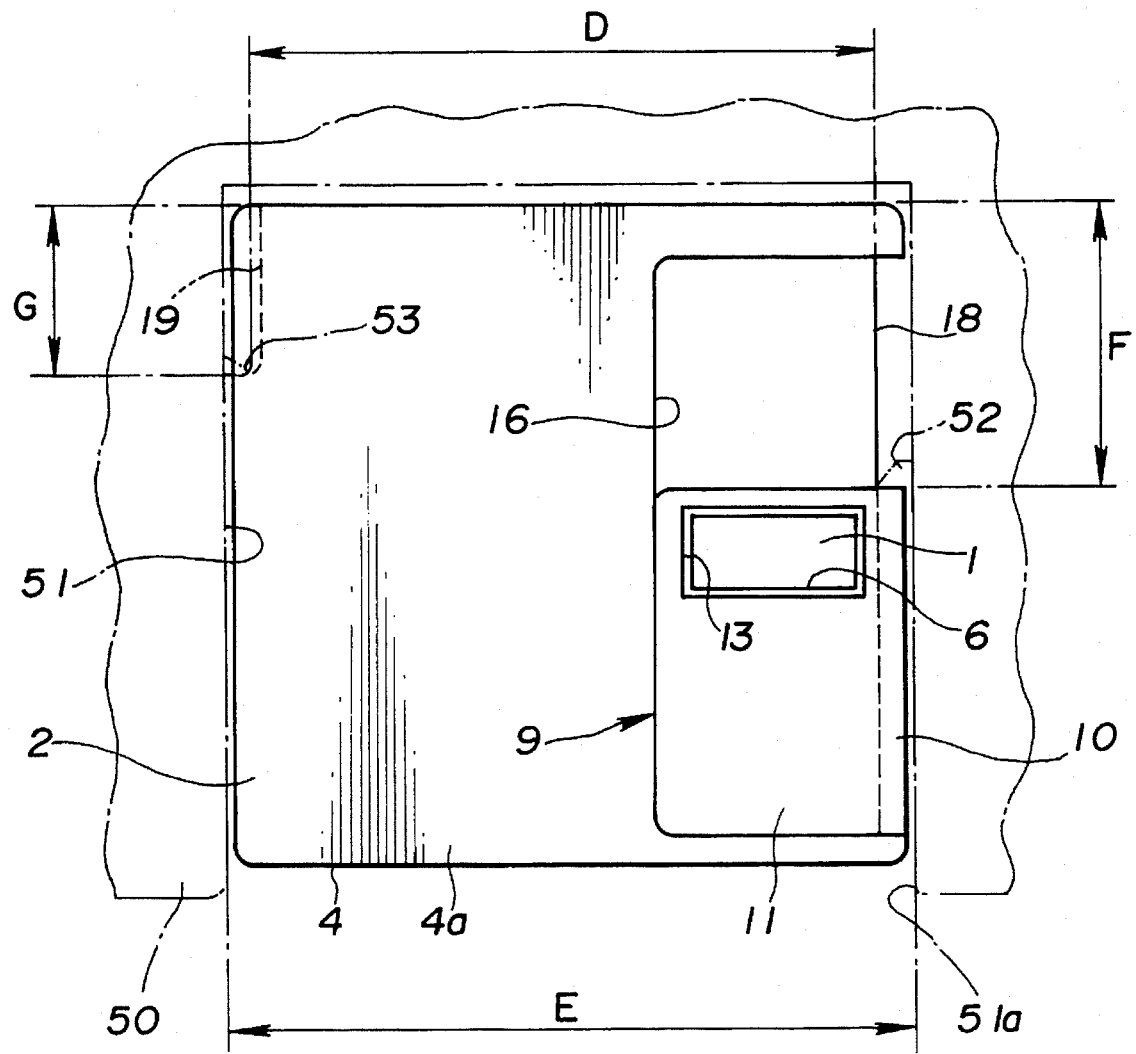
FIG. 7 is a plan view showing the disc cartridge shown in FIG. 6, with a shutter member closing a recording/reproducing aperture.

With the shutter member 9 sliding in this manner with respect to the cartridge body 2, the upper shutter plate 11 may be slid between a first position of closing the upper recording/reproducing aperture 6, with the aperture 6 then being out of register with the through-hole 13, as shown in FIG. 6, and a second position of opening the upper recording/reproducing aperture 6, with the aperture 6 then being in register with the through-hole 13, as shown in FIG. 7. Similarly, with the shutter member 9 sliding with respect to the cartridge body 2, the lower shutter plate 11 may be slid between a first position of closing the lower recording/reproducing aperture 7, with the aperture 7 then being out of register with the through-hole 14, and a second position of opening the lower recording/reproducing aperture 7, with the aperture 7 then being in register with the through-hole 14. These first and second positions are so oriented relative to each other that the direction from the second to the first position corresponds to the inserting direction of the disc cartridge into the disc recording and/or reproducing apparatus as shown by arrow L in FIGS. 5 and 6.

First and second shutter guide recesses 16 and 17 are formed in the portion of the major surfaces 4a and 5a of the cartridge body 2 corresponding to the travel passage of the shutter portions 11 and 12 of the shutter member 9. The first shutter guide recess 16 in the upper major surface 4a is formed in an area to be traversed by the upper shutter portion 11 as it is moved from the first position to the second position, and is of a depth from the upper major surface 4a of the order of, for example, 0.3 mm, corresponding to the thickness of the upper shutter portion 11. In this manner, the upper surface of the upper shutter portion 11 is substantially flush with the upper surface 4a throughout the stroke of movement of the shutter member 9 between the aforementioned first and second positions.

The second shutter guide recess 17 in the upper major surface 5a is formed in an area to be traversed by the lower shutter portion 12 as it is moved from the first position to the second position, and is of a depth from the lower major surface 5a of the order of, for example, 0.3 mm, corresponding to the thickness of the lower shutter portion 12. In this manner, the upper surface of the upper shutter portion 12 is substantially flush with the lower surface 5a throughout the stroke of movement of the shutter member 9 between the aforementioned first and second positions.

The lateral sides of the cartridge body 2 are formed with a shutter opening groove 18 and a mistaken insertion inhibiting groove 19, as shown in FIGS. 5 to 8.

The shutter opening groove 18 is formed on a lateral side of the cartridge body 2 along the direction of insertion of the disc cartridge into the disc recording and/or reproducing apparatus shown by arrow L in FIG. 6, that is along the sliding direction of the shutter member 9. The shutter opening groove 18 has a length $F_L$ between the leading edge of the cartridge body 2 in the inserting direction of the disc cartridge into the disc recording and/or reproducing apparatus and the leading edge of the slide portion 10 of the shutter member 9 when the shutter member is at the second position of opening the recording/reproducing apertures 6 and 7, as indicated by arrow F in FIG. 7.

The mistaken insertion inhibiting groove 19 is formed in the lateral side of the cartridge body 2 opposite to the lateral side thereof provided with the shutter opening groove 18, and is extended in a direction parallel to the shutter opening groove 18. The mistaken insertion inhibiting groove 19 has a length $G_L$ from the leading edge of the cartridge body which is shorter than the length of the shutter opening groove 18, as indicated by arrow G in FIG. 7. That is, the lengths $F_L$ and $G_L$ are related to each other by an inequality $$G_L < F_L \tag{1}$$

With the above described cartridge body 2, a length $B_L$ from the bottom of the shutter opening groove 18 to the bottom of the mistaken insertion inhibiting groove 19 as indicated by arrow B in FIG. 6 is selected to be shorter than a length $A_L$ of the side of the cartridge body 2 along the inserting direction. on the other hand, the length $B_L$ is selected to be shorter than a length $C_L$ of the side of the cartridge body 2 normal to the inserting direction, as indicated by arrow C in FIG. 6. That is, these lengths are related to one another by inequalities $$B_L < A_L \tag{2}$$

$$B_L < C_L \tag{3}$$

Figure 8:
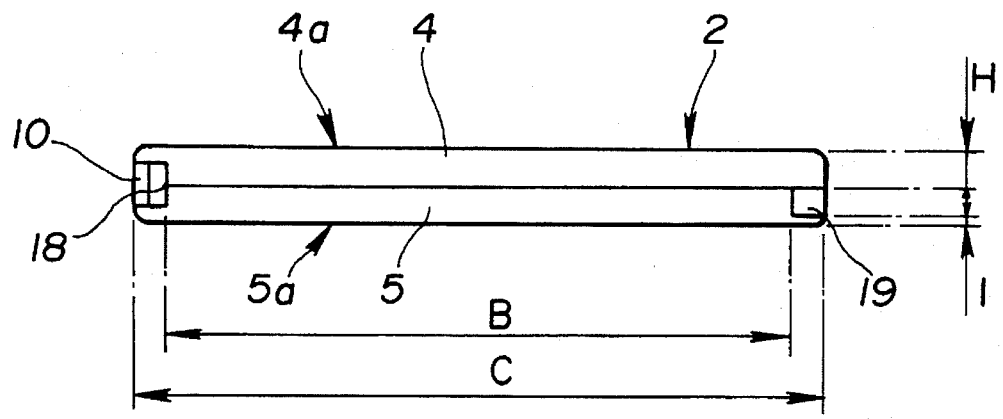
FIG. 8 is a side view, as viewed from the forward side, showing the disc cartridge shown in FIG. 6.

On the other hand, with the above described cartridge body 2, a length $H_L$ from the upper sidewall portion of the mistaken insertion inhibiting groove 19 to the upper major surface 4a as shown by arrow H in FIG. 8 is different from a length $I_L$ from the lower sidewall section of the mistaken insertion inhibiting groove 19 to the lower major surface 5a as indicated by arrow I in FIG. 8. That is, these lengths are related to each other by $$H_L \neq I_L \tag{4}$$

so that the mistaken insertion inhibiting groove 19 is slightly offset in a direction along the thickness of the cartridge body 2.

With the above described disc cartridge of the present invention, the shutter portions 11 and 12 of the shutter member 9 are in the first position of closing the recording/reproducing apertures 6 and 7, when the disc cartridge is not in use, for preventing intrusion of dust and dirt or the user's finger into the cartridge body 2 by means of the recording/reproducing apertures 6 and 7.

When the disc cartridge is in use, it is loaded in a cartridge loading unit 51 of the disc recording and/or reproducing apparatus, as shown in FIG. 7. A cartridge entrance opening 51a, providing an entrance to the cartridge loading unit 51, has a width slightly larger than the thickness of the cartridge body 2 and a length $E_L$ slightly larger than the length $C_L$ of the disc cartridge 2 in the direction normal to its inserting direction shown by arrow C in FIG. 6, as indicated by arrow E in FIG. 7. That is, these lengths are related to each other by an inequality $$C_L < E_L \tag{5}$$

The disc cartridge is introduced into the cartridge loading unit 51, by means of the cartridge entrance opening 51a, with the side of the cartridge body normal to the shutter member side thereof as the leading inserting side.

A shutter opening pin 52 is provided upright on an inner wall of the cartridge loading unit 51 facing the side of the cartridge body provided with the shutter opening groove 18. A mistaken insertion inhibiting pin 53 is provided upright on an inner wall of the cartridge loading unit 51 corresponding to the side of the cartridge body provided with the mistaken insertion inhibiting groove 19.

The distance $D_L$ between the foremost parts of these pins 52 and 53 as shown by arrow D in FIG. 7 is selected to be slightly longer than the length $B_L$ between the bottom of the shutter opening groove 18 and the bottom of the mistaken insertion inhibiting groove 19 as indicated by arrow B in FIG. 6. On the other hand, the distance $D_L$ is selected to be shorter than the length $C_L$ along the inserting direction of the disc cartridge. In addition, the distance $D_L$ is selected to be shorter than the length $A_L$ along the inserting direction of the disc cartridge 1. That is, the above lengths are related to one another by inequalities $$B_L < D_L \tag{6}$$

$$D_L < C_L \tag{7}$$

$$D_L < A_L \tag{8}$$

Referring to FIG. 7, the shutter opening pin 52 is positioned so that, when the disc cartridge is kept in position within the cartridge loading unit 51, the pin 52 is spaced apart from the leading edge of the cartridge body 2 by a distance corresponding to the length $F_L$ of the shutter opening groove 18 shown by arrow F in FIG. 7. On the other hand, the mistaken insertion inhibiting pin 53 is positioned so that, when the disc cartridge is kept in position within the cartridge loading unit 51, the pin 53 is spaced apart from the leading edge of the cartridge body 2 by a distance corresponding to the length $G_L$ of the mistaken insertion inhibiting groove 19 shown by arrow G in FIG. 7. The mistaken insertion inhibiting pin 53 is slightly offset along the direction of thickness of the cartridge body 2 for mating with the mistaken insertion inhibiting groove 19.

Meanwhile, when the disc cartridge is introduced by means of the entrance opening 51a halfway in the cartridge loading unit 51, the shutter opening pin 52 is intruded into the shutter opening groove 18. The slide portion 10 of the shutter member 9 is abutted against the shutter opening pin 52. When the disc cartridge is introduced into the interior of the cartridge loading unit 51, the shutter member 9 is left at a position in which the slide portion 10 is abutted against the shutter opening pin 52. Thus the shutter member 9 is slid from the position of closing the apertures 6 and 7 by its shutter portions 11 and 12 towards the position of opening the apertures by the shutter portions.

When the disc cartridge is further introduced into the interior of the cartridge loading unit 51, the mistaken insertion inhibiting pin 53 is intruded into the inside of the mistaken insertion inhibiting groove 19. The shutter member 9 is further slid for bringing the shutter portions 11 and 12 to the position of opening the recording/reproducing apertures 6 and 7 for opening these recording/reproducing apertures. At this time, information signals may be recorded of reproduced on or from the disc 1 by means of the recording/reproducing apertures 6 and 7.

With the above described disc cartridge, from the formulas (3), (5) and (7), the following inequality $$B_L < D_L < C_L < E_L \qquad (9)$$

holds. Therefore, even if the mistaken inserting operation of inserting the disc cartridge from its fear side first into the cartridge loading unit 51 by means of the cartridge entrance opening 51a should be performed, the disc cartridge is abutted against the mistaken insertion inhibiting pin 53 and thereby prevented from being introduced further into the interior of the cartridge loading unit 51.

On the other hand, from the formulas (2), (6) and (8), the following inequality $$B_L < D_L < A_L + tm \qquad (10)$$

holds. Therefore, even if the mistaken inserting operation of inserting the disc cartridge into the cartridge loading unit 51 by means of the cartridge entrance opening 51a from the direction normal to the correct inserting direction should be performed, the disc cartridge is abutted against the mistaken insertion inhibiting pin 53 and thereby prevented from being introduced further into the interior of the cartridge loading unit 51.

In addition, with the present disc cartridge, the mistaken insertion inhibiting groove 19 is shorter in length than the shutter opening groove 18, and is offset along the thickness of the cartridge body 2. Therefore, even if the mistaken inserting operation of inserting the disc cartridge into the cartridge loading unit 51 in a topsy-turvied position should be performed, the disc cartridge is abutted against the mistaken insertion inhibiting pin 53 and thereby prevented from being introduced further into the interior of the cartridge loading unit 51.

Besides, with the present disc cartridge, the mistaken insertion inhibiting groove 19 is shorter in length than the shutter opening groove 18. Therefore, the present disc cartridge need not be enlarged in size beyond the size of the disc accommodated therein for the sake of providing the mistaken insertion inhibiting groove 19, so that the disc cartridge may be reduced in size.

Figure 9:
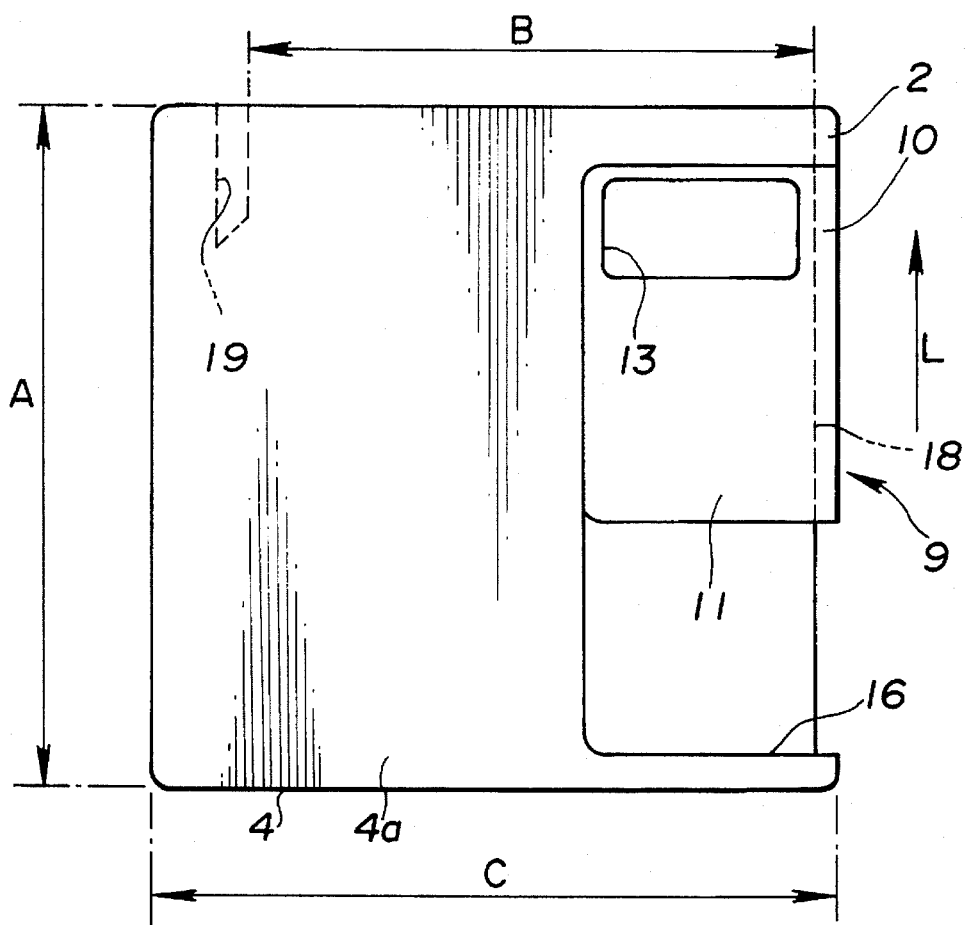
FIG. 9 is a plan view showing a disc cartridge according to a modified embodiment of the present invention.
Figure 10:
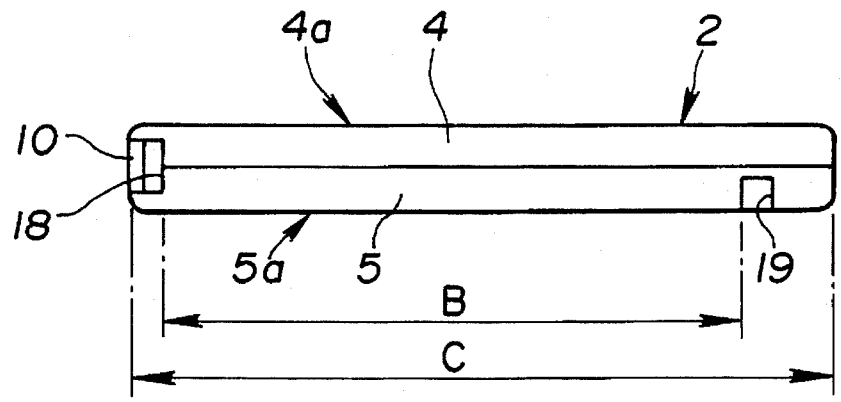
FIG. 10 is a side view, as viewed from the forward side, showing the disc cartridge shown in FIG. 9.

The disc cartridge of the present invention may also be so constructed that, as shown in FIGS. 9 and 10, the mistaken insertion inhibiting groove 19 is provided in the upper major surface 4a or in the lower major surface 5a. With the disc cartridge shown in FIGS. 9 and 10, the mistaken insertion inhibiting groove 19 is provided in the lower major surface 5a. The mistaken insertion inhibiting groove 19 is shorter in length than the shutter opening groove 18, as in the above described embodiment. The mistaken insertion inhibiting groove 19 is so designed that the length $B_L$ from the bottom of the shutter opening groove 18 to the sidewall of the mistaken insertion inhibiting groove 19 along the one lateral side of the cartridge body 2 as indicated by arrow B in FIGS. 9 and 10 is shorter than the length $C_L$ of the cartridge body 2 along the direction normal to the inserting direction of the disc cartridge shown by arrow C in FIGS. 9 and 10. On the other hand, the length $B_L$ is selected to be shorter than the length $A_L$ of the cartridge body 2 along its inserting direction as indicated by arrow A in FIG. 9.

With the above described disc cartridge, by providing the mistaken insertion inhibiting pin within the cartridge loading unit 51 of the disc recording and/or reproducing apparatus 50 for mating with the mistaken insertion inhibiting groove 19, the mistaken inserting operation of inserting the disc cartridge in an inserting direction different from the correct inserting direction may be inhibited without enlarging the size of the cartridge body 2.

Figure 11:
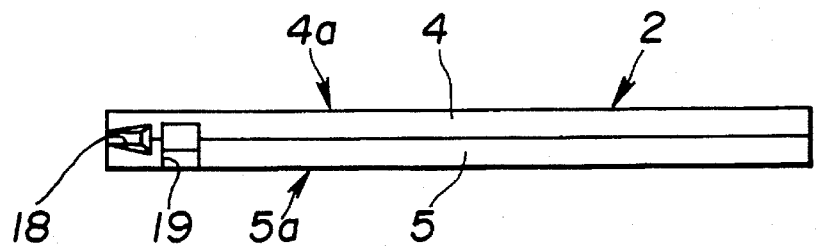
FIG. 11 is a side view, as seen from the forward side, showing a disc cartridge according to another modified embodiment of the present invention.
Figure 12:
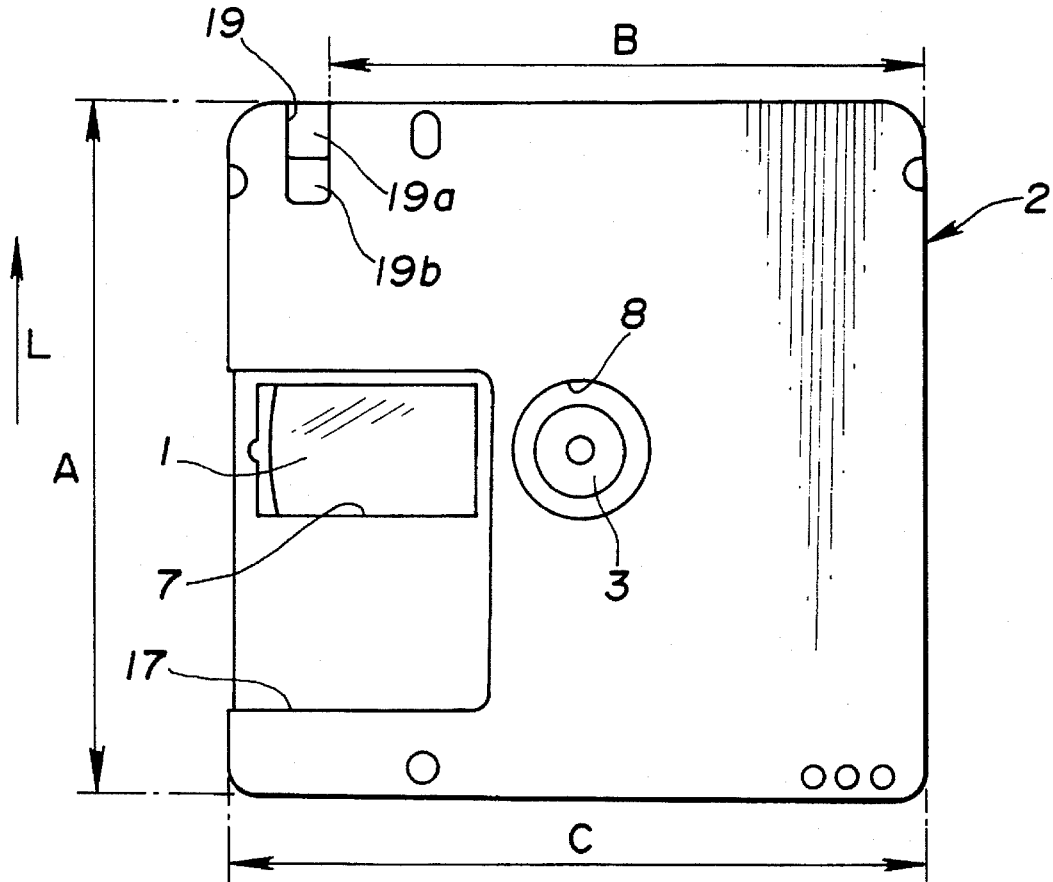
FIG. 12 is a plan view showing the disc cartridge shown FIG. 11.
Figure 13:
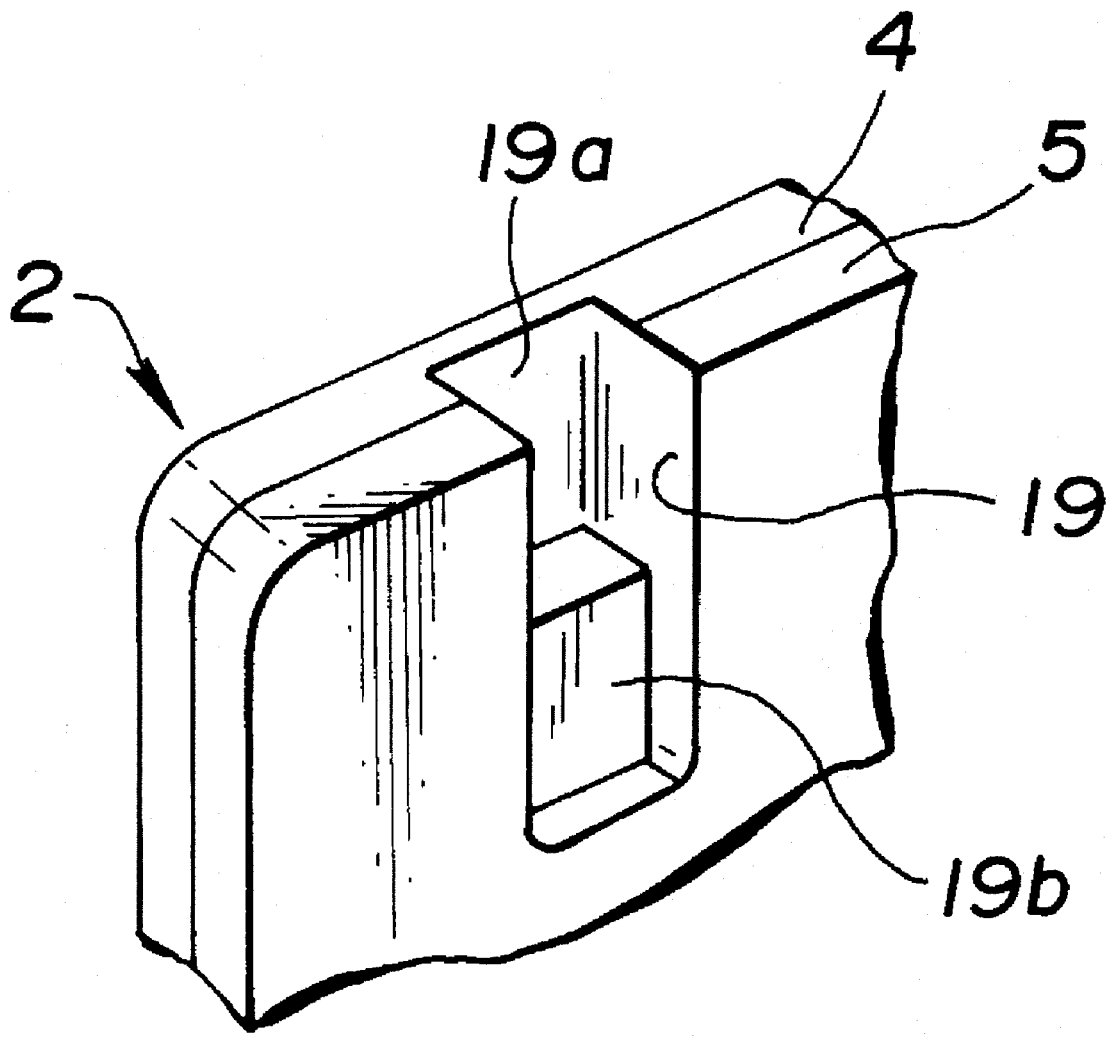
FIG. 13 is an enlarged perspective view showing the mistaken insertion inhibiting groove in the disc cartridge shown in FIG. 11.

The disc cartridge of the present invention may also be so constructed that, as shown in FIGS. 11 to 13, the mistaken insertion inhibiting groove 19 has a plurality of regions 19a, 19b of different depths from the lower major surface 5a. Meanwhile, the disc 1 accommodated within the disc cartridge shown in FIGS. 11 to 13 is a so-called magneto-optical disc or an optical disc. In FIGS. 11 to 13, the shutter member for opening or closing the recording/reproducing aperture 7 for exposing the disc 1 to outside is not shown for clarity.

The cartridge body 2 of the present disc cartridge comprised of an upper half 4 and a lower half 5 abutted and connected to each other, similarly to the cartridge body 2 of the preceding embodiments. The lower major surface 5a of the cartridge body 2 is provided with a central chucking opening 8 by means of which the lower surface of the disc hub 3 provided at the center of the disc 1 is exposed to outside.

This cartridge body 2 is introduced into the disc recording and/or reproducing apparatus with the direction shown by arrow L in FIG. 12 as the inserting direction. With the present disc cartridge, the length $B_L$ from its one lateral side to a lateral side of the mistaken insertion inhibiting groove 19 as indicated by arrow B in FIG. 12 is selected to be shorter than the length $A_L$ along the inserting direction of the cartridge body 2 shown by arrow A in FIG. 12. On the other hand, with the present disc cartridge, the length $B_L$ from its lateral side to the lateral side of the mistaken insertion inhibiting groove 19 is selected to be shorter than the length $C_L$ along the direction normal to the inserting direction of the cartridge body 2 shown by arrow C in FIG. 12. That is, the above mentioned formulas (2) and (3) hold with the cartridge body 2 of the present disc cartridge.

Thus, with the present disc cartridge, by providing the mistaken insertion inhibiting pin within the cartridge loading unit 51 of the disc recording and/or reproducing apparatus for mating with the mistaken insertion inhibiting groove 19, the mistaken inserting operation of inserting the disc cartridge into the cartridge loading unit 51 from the direction different from the correct inserting direction may be inhibited without enlarging the size of the cartridge body 2.

The mistaken insertion inhibiting groove 19 in the cartridge body 2 of the disc cartridge is formed with first and second regions 19a, 19b of different depths from the lower major surface 5a. The first region 19a is situated towards the forward side of the cartridge body 2 within the mistaken insertion inhibiting groove 19, while the second region 19b is situated towards the rear of the first region 19a within the mistaken insertion inhibiting groove 19.

The depth of the second region 19b of the mistaken insertion inhibiting groove 19 from the lower major surface 5a is substantially equal to the depth of the mistaken insertion inhibiting groove 19 in the disc cartridge shown in FIGS. 9 and 10. The depth of the first region 19a of the mistaken insertion inhibiting groove 19 is different from the depth of the second region 19b and associated with the type of the disc accommodated in the disc cartridge. By way of illustrating the various disc types, the disc 1 may be a magneto-optical disc in which information signals can be recorded and reproduced, or a so-called rewritable disc in which information signals can be recorded and reproduced. The disc 1 may also be a so-called rewritable disc in which the information signals, once recorded by the user, can not be erased, that is a disc in which recording may be made only once. The disc 1 may alternatively be an optical disc in which information signals may only be reproduced, that is a so-called read-only disc. Thus the first region 19a of the mistaken insertion inhibiting groove 19 may be used as an indicating groove for indicating the type of the disc 1.

That is, with the disc recording and/or reproducing apparatus, making use of the above described disc cartridge, when the disc cartridge is inserted in position within the cartridge loading unit, the mistaken insertion inhibiting pin is intruded into the second region 19b of the mistaken insertion inhibiting groove 19, that is to close to the rear end of the mistaken insertion inhibiting groove 19. With the present disc recording and/or reproducing apparatus, the depth of the mistaken insertion inhibiting groove 19 in the first region 19a is sensed by a disc type sensor constituted by microswitch(es) or link(s). With the present disc recording and/or reproducing apparatus, the type of the disc 1 is discriminated on the basis of the depth of the mistaken insertion inhibiting groove 19 in the first region 19b, and the intensities of the magnetic field generated by the magnetic head device for signal writing, the state of operation or non-operation or the light output generated by the optical head device, may be adjusted or switched depending on the discriminated disc type.

Meanwhile, if the depths from the lower major surface 5a of the first and second regions 19a, 19b of the mistaken insertion inhibiting groove 19 are selected to be equal to each other, the present disc cartridge is similar in construction to the disc cartridge shown in FIGS. 9 and 10. In such case, the first region 19a of the mistaken insertion inhibiting groove 19 may still be used as an indicating groove for indicating the disc type. It is noted that the first region 19a of the mistaken insertion inhibiting groove 19 may be of the same thickness as the cartridge body 2, that is, the first region 19a of the groove 19 may be formed as a through-slot extending from the lower major surface 5a to the upper major surface 4a.

When the mistaken insertion inhibiting groove 19 is divided into a plurality of regions, the number of the regions may be three or more instead of being limited to two, as in the preceding embodiment. The groove 19 may also be divided in the transverse direction with respect to the inserting direction of the disc cartridge into the disc recording/reproducing apparatus, instead of in the fore and aft direction with respect to the inserting direction, as in the above embodiment.

It is noted that the mistaken insertion inhibiting groove 19 provided in the lateral side of the cartridge body 2 as shown in FIGS. 6 to 8 may also be divided into a plurality of regions of different depths.

Meanwhile, the present invention is not limited to a disc cartridge in both major surfaces of which the recording/reproducing apertures 6 and 7 are formed, as in the preceding embodiments. That is, the present disc cartridge may also be provided with a recording/reproducing aperture in only one of the major surfaces of the disc cartridge. In such case, the shutter member 9 is provided only with a shutter portion associated with the recording/reproducing aperture.

The present invention also is not limited to a disc cartridge for an optical of magneto-optical disc as shown in the preceding embodiments, but may equally be applied to other recording media for other systems, such as a flexible magnetic disc.

What is claimed is:

1. A disc cartridge comprising:

a cartridge body having a thickness and an aperture for exposing at least a part of a signal recording area of a disc accommodated therein;

a shutter slidably mounted on said cartridge body for opening and closing said aperture, the shutter being slidable in a recess formed in a pair of opposing, parallel, lateral faces of the cartridge body;

a shutter opening groove formed in a first lateral side of said cartridge body and extending along a sliding direction of said shutter which is parallel to the direction of insertion of the disc cartridge into a recording and/or reproducing apparatus;

a mistaken insertion inhibiting groove formed in a second lateral side of said cartridge body and extending parallel to said shutter opening groove, and said mistaken insertion inhibiting groove being shorter in length than the length of said shutter opening groove;

wherein said shutter opening groove and the mistaken insertion inhibiting groove are both opened on a third lateral side of said cartridge body which is a leading lateral side in the direction of insertion of the disc cartridge into the recording and/or reproducing apparatus; and wherein the length (G) of the mistaken insertion inhibiting groove and a length (F) along the direction of the shutter opening groove to a leading edge of the shutter when the shutter is in an open position are taken in directions parallel to the shutter sliding direction and the length (G) of the mistaken insertion inhibiting groove is less than the length (F) along the direction of the shutter opening groove to the leading edge of the shutter when the shutter is in the open position.

* * * * *